Patented Aug. 21, 1934

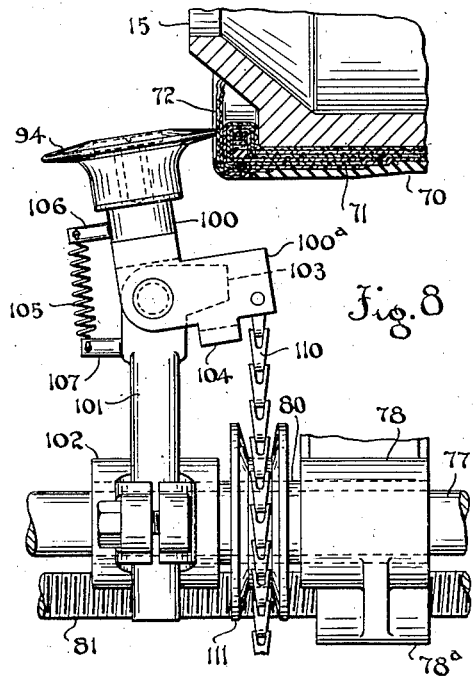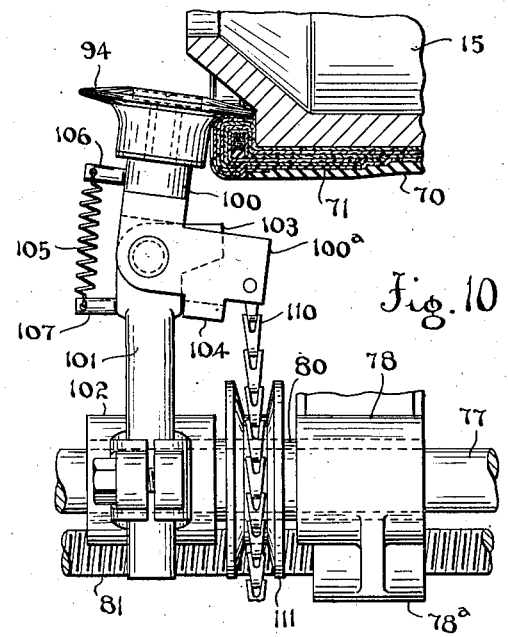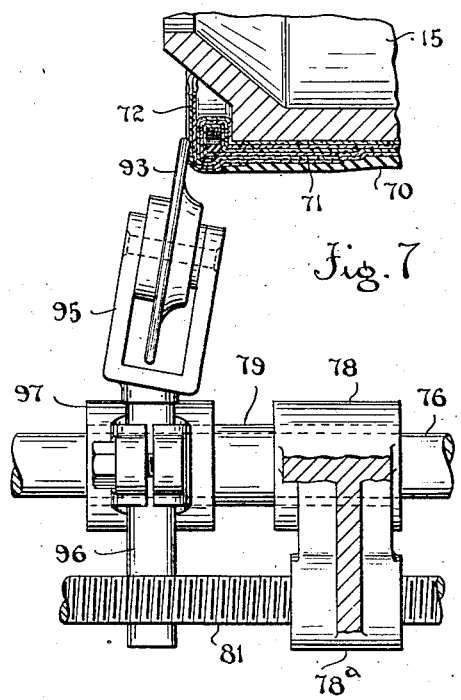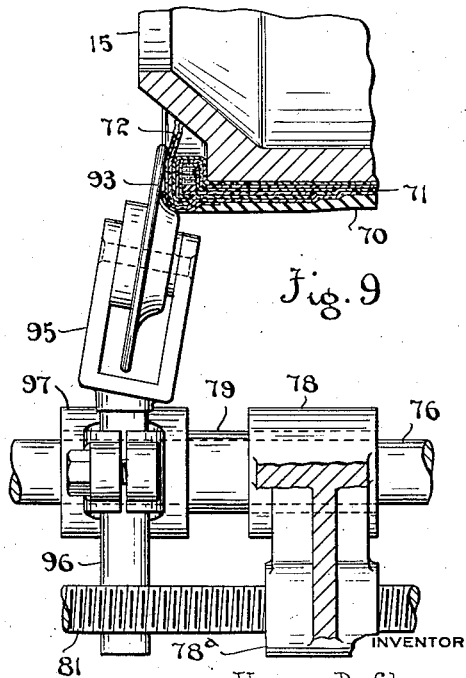

1,970,780

UNITED STATES PATENT OFFICE 1,970,780

TIRE BUILDING APPARATUS

Horace D. Stevens, Akron, Ohio, assignor to The Firestone Tire & Rubber Company, Akron, Ohio, a corporation of Ohio Application June 6, 1932, Serial No. 615,563

8 Claims. (Cl. 154—10)

This invention relates to tire building apparatus, and more especially it relates to mechanism associated with machines for building pneumatic tire casings of the flat band type, which mechanism rolls down the tread slab of the tires, and folds and stitches the over-bead fabric plies around the bead portions of the tires.

The chief objects of the invention are to effect the building of tire casing in an improved and more facile manner; to provide mechanical means for performing operations heretofore performed manually; and to provide means for pressing a tread slab onto a tire carcass with pressure that is graduated according to the thickness of the tread slab in various transverse regions thereof. Other objects will be manifest in the following specification.

Of the accompanying drawings:

Figure 7 is a section on the line 7—7 of Figure 5;

Figure 8 is a section on the line 8—8 of Figure 5;

Figure 9 is a section on the line 9—9 of Figure 6; and

Figure 10 is a section on the line 10—10 of Figure 6.

Figure 2:
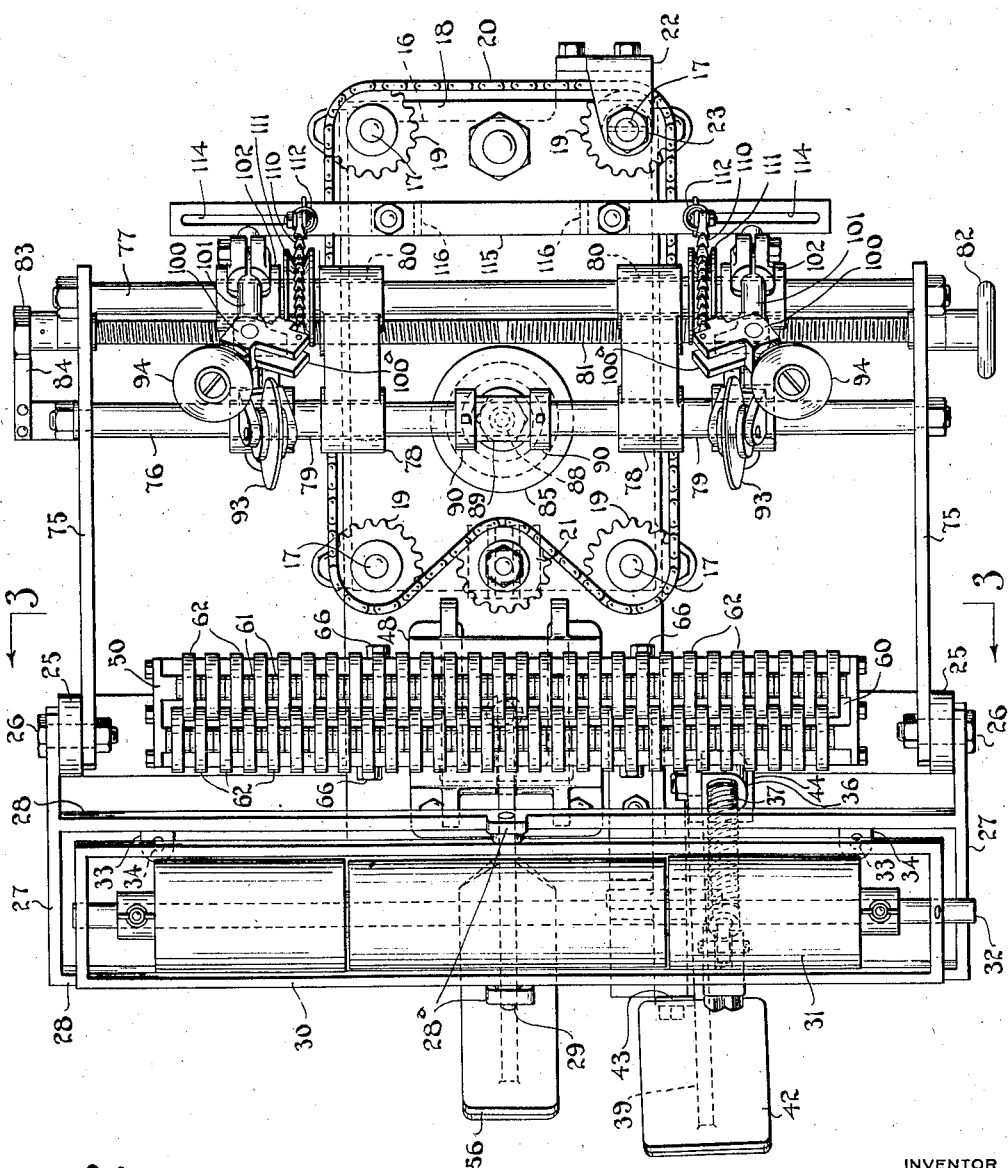
Figure 2 is a plan view thereof.
Figure 3:
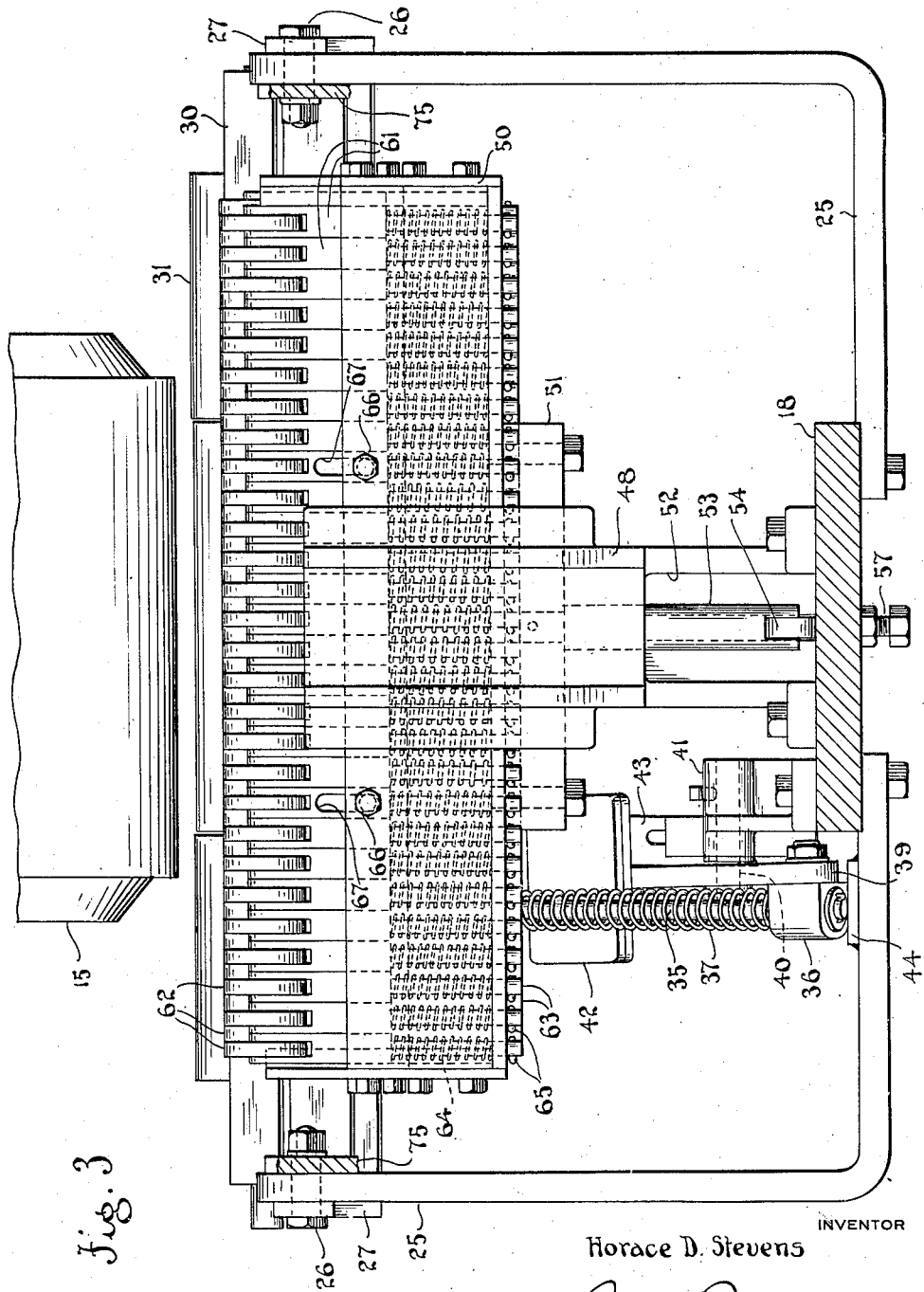
Figure 3 is a section on the line 3—3 of Figure 2, showing the tread-pressing mechanism in elevation, in inoperative position.
Figure 4:
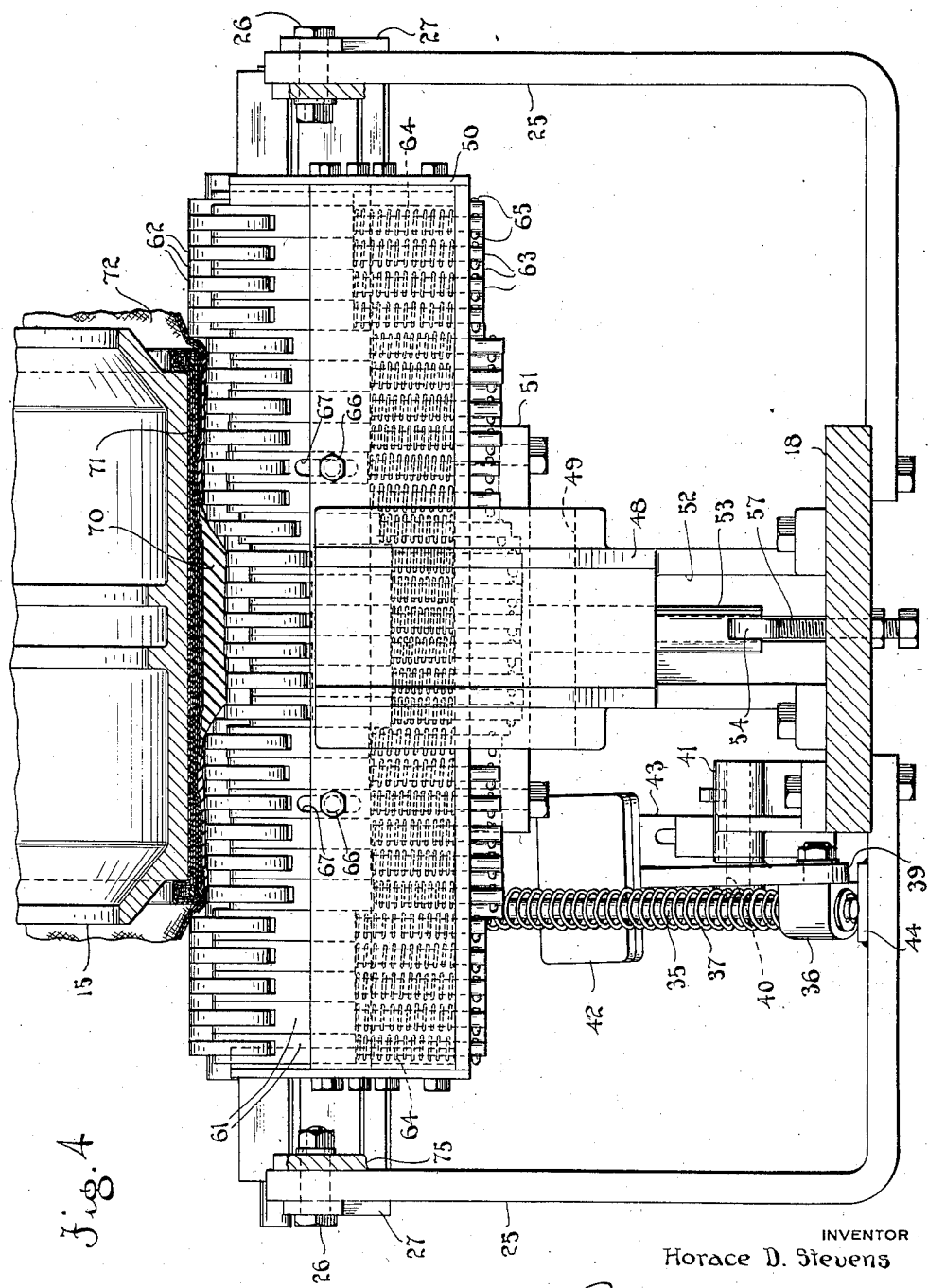
Figure 4 is a view of the mechanism shown in Figure 3, as it appears in operative engagement with the work.

Referring to the drawings, 15 is an annular rotatable tire building form or drum of the common shouldered type, said drum being supported and driven by any suitable or known mechanism (not shown). Mounted upon the floor beneath the drum 15 is a rectangular base plate 16, and rising from the four corners thereof are threaded posts or screws 17, 17 that have their lower end portions journaled in said base plate. The posts 17 are threaded through and support a deck or platform 18, and above the deck the posts 17 are provided with respective sprockets 19 that are interconnected by a sprocket chain 20 that is trained about them and about an idler sprocket 21. The latter is adjustably journaled, as is shown in Figure 2, to permit it to be used for tightening the chain 20. Rising from one corner of the base plate 16 is an angular bearing bracket 22 for the upper end of the post 17, and this post has a square or hexagon head 23 secured thereto by means of which the post is engaged by a suitable tool such as a hand crank for turning the post. Rotation of one post will rotate the other posts and elevate or lower the deck 18, the latter remaining level, on a horizontal plane, at all times.

Figure 1:
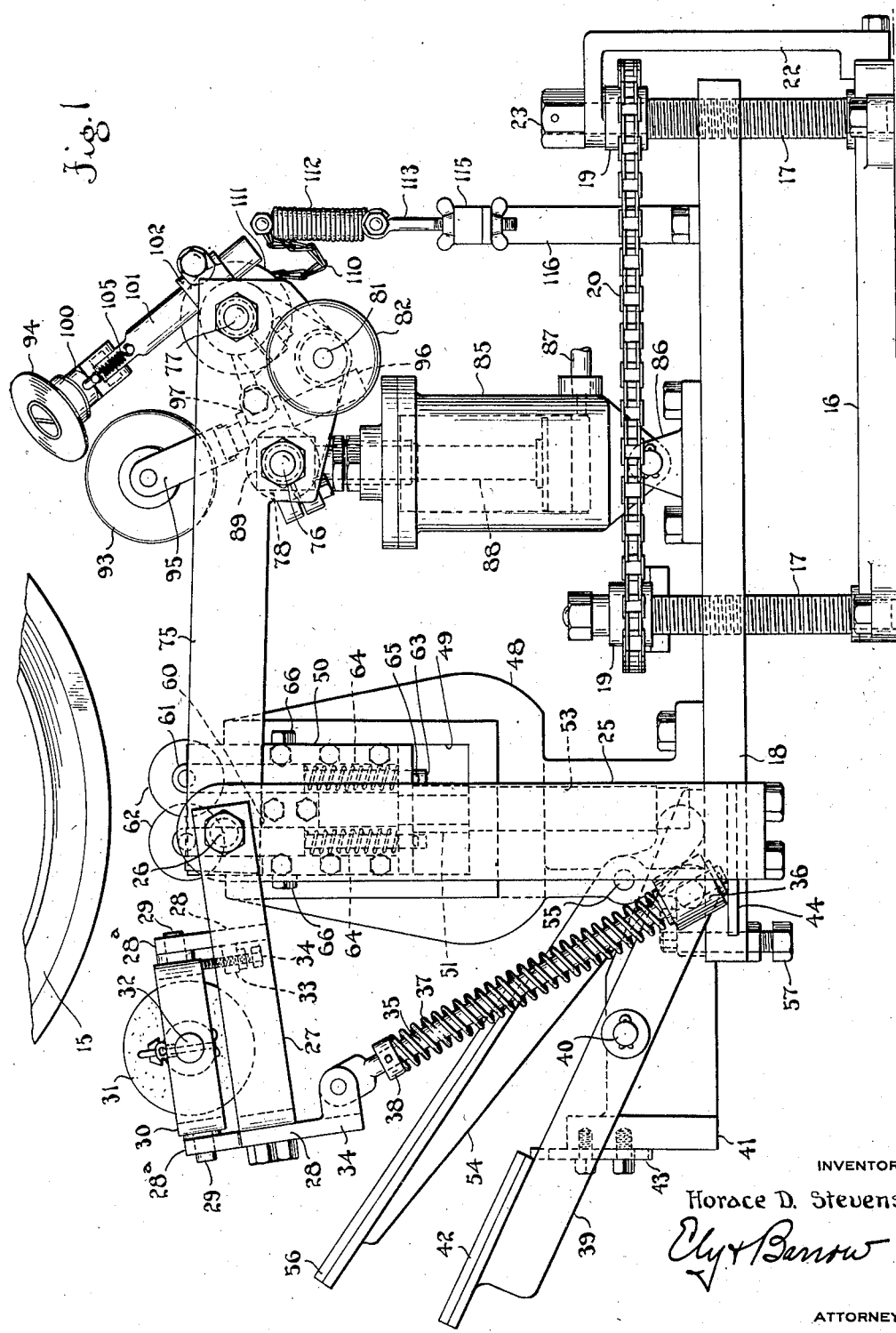
Figure 1 is a side elevation of apparatus embodying the invention in its preferred form.
Figure 5:
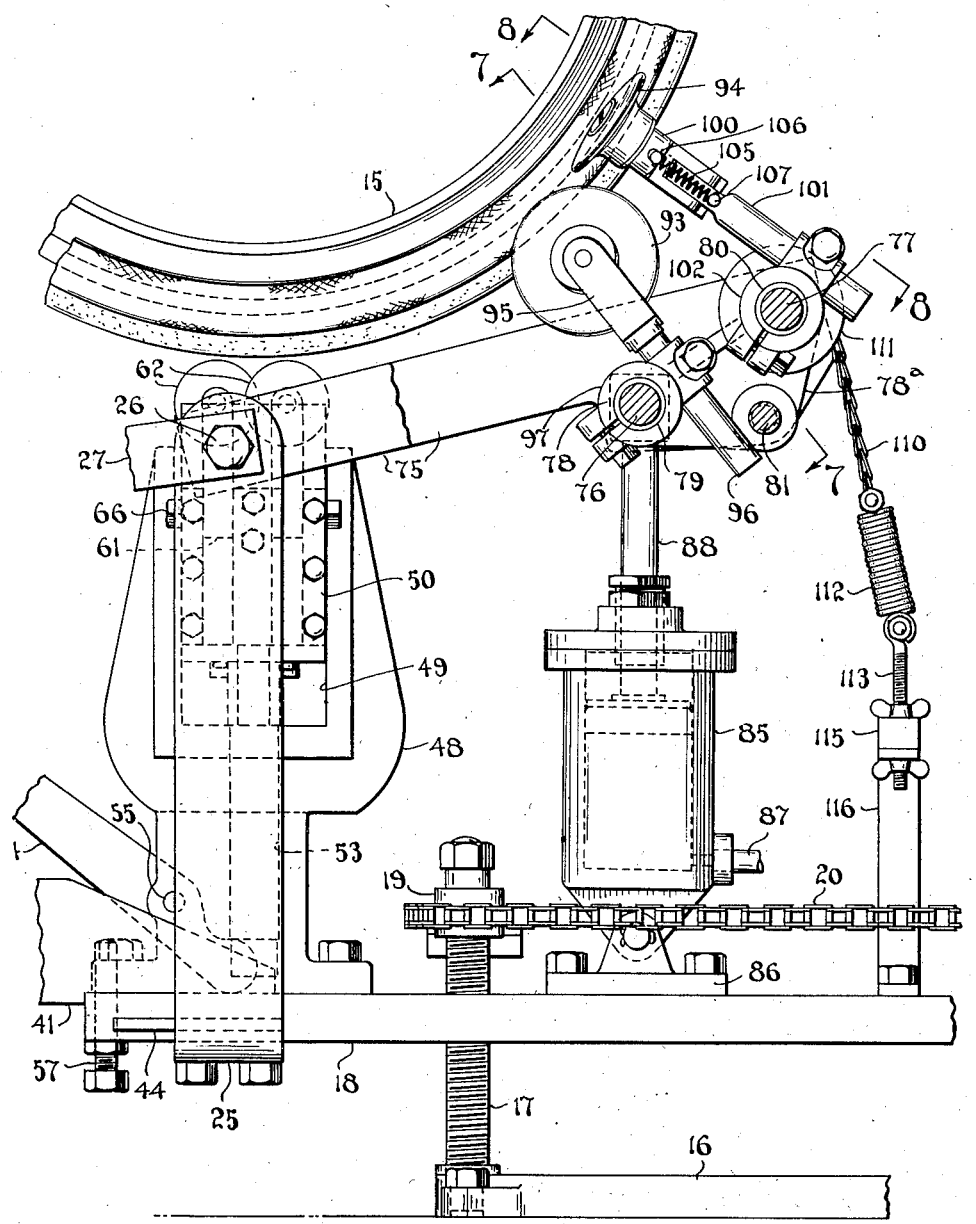
Figure 5 is a side elevation of the apparatus as it appears during the initial operative movement of the bead-stitching mechanism.
Figure 6:
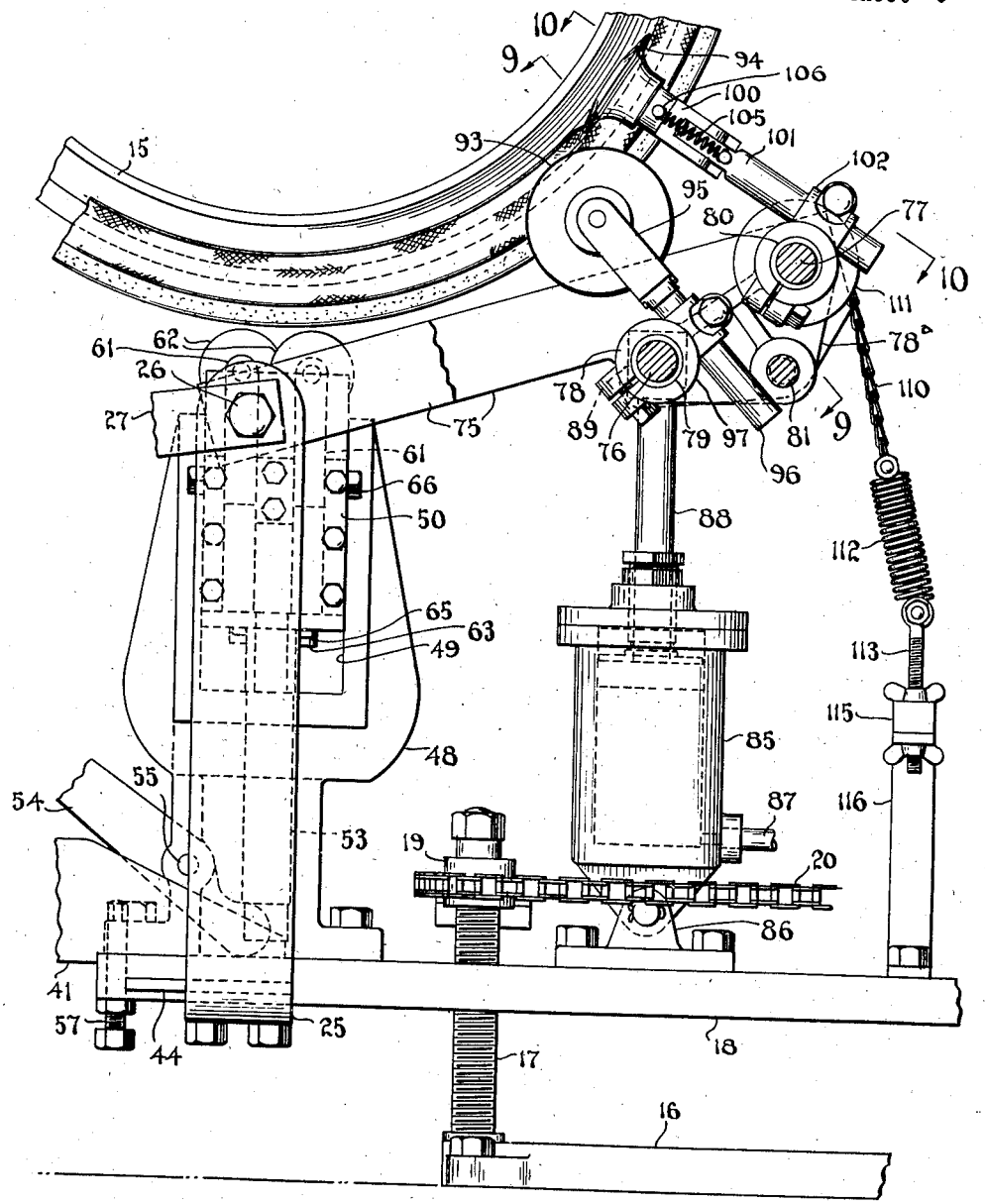
Figure 6 is a view similar to Figure 5 with the bead-stitching mechanism in its final operative position.

Mounted upon the front end portion of the deck 18, which is the left end as viewed in Figures 1, 5 and 6, are L-shaped bracket arms 25, 25 that extend laterally and upwardly from the respective sides of said deck. Pivotally mounted upon pivot-bolts 26, 26 in the upper ends of bracket arms 25 are respective forwardly-extending lever-arms 27, 27 that are connected centrally and at their ends by cross members 28, 28. The latter are centrally formed on their top margins with respective upstanding ears 28ª, 28ª that comprise bearings for studs or pivot pins 29, 29 of an elongate rectangular frame 30. A three-part resilient presser roller 31 is journaled upon a suitable shaft 32 that is mounted in the frame 30 and disposed parallel to the surface of the tire building form 15. The rear cross member 28 is formed with laterally projecting ears 33, 33 that are disposed beneath the opposite end portions of the frame 30, and adjusting screws 34, 34 in the ears 33 engage the said frame to provide angular adjustment thereof about its pivot points 29.

The front cross member 28 is formed, near its middle, with a downward extension 34ª that has an offset ear to which is pivotally connected one end of a push rod 35. The other end portion of the push rod has a slidably mounted collar 36 thereon, and a compression spring 37 is mounted upon said push rod between the slidable collar 36 and a collar 38 that is fixedly secured near the opposite end of the push rod. The slidable collar 36 is pivotally connected to one end of a foot-lever 39 that is fulcrumed at 40, intermediate its ends, upon a suitable bracket 41 that is mounted upon the front margin of the deck 18. The front end of the lever 39 has a treadle portion 42 that is conveniently positioned for an operator in front of the machine. The bracket 41 carries an adjustably positioned plate 43 that is disposed beside the lever 39, and the latter is fulcrumed loosely so that it may be moved laterally beneath the lower end of said plate to hold the lever in depressed position. The arrangement is such that the presser roller 31 may be yieldingly urged against the form 15, and the purpose of the roller is to press the respective fabric plies of a tire carcass onto the drum and into adhesive engagement with each other. The weight of the mechanism on the arms 27 is such that the device normally is disposed in the lowered, inoperative position shown, with the collar 36 resting upon a support plate 44 secured to the adjacent lateral margin of a bracket arm 25.

Mounted centrally upon the front end portion of the deck 18 and directly below the form 15 is a pedestal 48 that is formed with a slideway 49 that is open at the top and at both ends. Mounted for vertical movement in said slideway is a slide 50 that consists of a rectangular box-like structure having an open top. A spacer-block 51 is mounted upon the bottom of the slide 50, said spacer block resting upon the bottom of the slideway 49 when the slide is in lowermost position. Below the slideway 49 the pedestal 48 is bifurcated to provide a through-opening or recess 52, and a push rod 53 that is secured at its upper end to the spacer-block 51 extends slidably through the intervening portion of the pedestal and into the recess 52. The lower end portion of the push rod 53 is forked to receive one end of a foot-lever 54 that is fulcrumed at 55 on the pedestal, the front end of said lever being provided with a foot treadle 56 that is positioned beside the treadle 42. An adjustable stop-member 57 for the lever 54 is threaded through the deck 18 in front of the fulcrum 55. The arrangement is such that the slide 50 may be raised by the foot-lever 54, the weight of the slide restoring it to lowermost position when the foot-lever is released.

Within the slide 50 and extending longitudinally thereof is a center bar 60, (Figure 2) and arranged on each side of said bar, between the latter and the sidewalls of the slide, are respective series of laterally abutting stitcher disc holders 61, 61. The holders 61 of one series are disposed in staggered relation to the holders of the other series. Each holder 61 has a stitcher disc 62 journaled in its upper end portion, the arrangement being such that the discs of one series are intercolated or interfitted between the discs of the opposite series. The holders 61 are yieldingly mounted, and to this end each of them is formed with a downwardly-extending stem 63 that projects through an aperture in the bottom of the slide. A compression spring 64 is mounted upon each stem 63 between the holder 61 and bottom of the slide, and a pin 65 extends through the free end of the stem, exteriorly of the slide, to limit the upward movement of the holder under the impetus of the spring 64. At two points on opposite sides of the slide, and on opposite sides of the pedestal 48, respective bolts 66, 66 extend through the sidewalls of the slide and through slots 67 formed in respective holders 61 and are threaded into the center bar 60. The bolts 66 assist in resisting lateral pressure against the holders during the operation of the stitching discs upon the work.

The arrangement is such that the movement of the slide 50 under the impetus of the foot-lever 54, is radial with relation to the form or drum 15, and the stitcher discs 62 are disposed on opposite sides of a radial plane passing through axis of the drums 15 and through the center of the slide 50. The stitcher discs are adapted yieldingly to engage the work on the form 15 and are especially designed for pressing down the tread slab 70 of a tire casing 71 built upon said form. Being relatively narrow in width, the discs 61 easily conform to the irregular profile of the work and assure that every portion thereof is adequately pressed. Springs 64 of the various stitcher discs may be of different strengths according to the thickness of that portion of the tread slab 71 on which the respective discs operate. Thus the thinner portions of the tread slab that ultimately constitute the sidewalls of the tire are not distorted or displaced by unduly heavy pressure such as is required for rolling down the thick medial portion of the tread slab.

In addition to the tread-stitching mechanism described, the apparatus comprises mechanism for engaging the respective marginal portions 72, 72 of the over-bead plies of fabric of the tire carcass 70, and for folding said portions around and under the beads of the tire. Said over-bead fabric plies usually include chafer strips that are applied to the outermost fabric plies of the tire near the lateral margins thereof.

The mechanism for operating upon the bead portions of the work comprises a pair of lever arms 75, 75 that are pivotally mounted at one end upon the respective pivot-bolts 26, and extend rearwardly therefrom and are interconnected at their free ends by a pair of parallel, spaced-apart, cross-rods 76, 77. Mounted upon the said cross-rods is a pair of brackets 78, 78, and each bracket is provided with a pair of sleeves or bushings 79, 80 that extend laterally from the bracket, about the respective cross-rods 76, 77. The brackets 78 are positioned equi-distant each side of the middle of the cross-rods, and each bracket has a downward extension 78ª (see Figures 5, 7 to 10) through which is threaded a shaft 81 formed with right and left-hand threads, one bracket engaging the right-hand threads and the other bracket engaging the left-hand threads. The shaft 81 is journaled at its respective ends in the lever arms 75, and one end of the shaft is provided with a knob 82 by which the shaft may be manually rotated to move the brackets 78 from and toward each other. At the opposite end of the shaft 81 is click-pawl mechanism comprising a square-head ratchet 83 mounted upon the shaft and a flat leaf spring 84 engaging one of the flat faces of said ratchet. The click-pawl lightly holds the shaft 81 in determinate angular positions.

The structure carried by the lever arms 75 includes bead-stitching tools presently to be described, which tools are moved into and out of operative relation to the tire 71 by means of a vertically disposed one-way fluid pressure operated cylinder 85 that is pivotally mounted at one of its ends upon a bracket 86 that is mounted upon the deck 18. The cylinder 85 is provided at its lower end with the usual fluid inlet-and-outlet pipe 87, and has the usual piston rod 88 extending upwardly from its opposite end, the outer end of said piston rod being connected to a suitable block 89 that is journaled upon the cross rod 76 between collars 90, 90. Charging of the cylinder 85 lifts the lever arms 75 and mechanism carried thereon, and the opening from the pipe 87 into the cylinder 80 is relatively small so that the upward movement of the lever arms is relatively slow. The weight of said mechanism lowers the arms by gravity when the cylinder 85 is discharged.

Associated with each bracket 78 are two bead-stitching tools or discs 93, 94 of which the disc 93 is arranged to engage the marginal portion 72 of the fabric plies of the tire 71 before the tool 94, and to turn said plies radially inwardly and to press them against the lateral face of the bead portion of the tire, as is most clearly shown in Figures 7 to 10. The tool 94 is arranged to follow up the tool 93 and to turn said marginal portion 72 inwardly and to lay it under the tire bead, against the inner peripheral surface of the latter. Since each pair of tools 93, 94 are identical, a description of one pair will be sufficient.

The tool 93 consists of a disc that is journaled in a forked holder 95 having a stem 96 that is adjustably mounted for longitudinal movement in a holder 97 that is clamped onto the sleeve or bushing 79 of a bracket 78. The holder 95 is slightly angular as shown so that the tool 93 is disposed at a slight angle to the plane of the drum, with the result that only the perimeter of the tool engages the work and there is no wiping of the lateral face of the tool against the work.

The tool 94 consists of a disc that has its axis disposed substantially at right angles to the axis of the tool 93, and subtantially radial with relation to the tire building form 15. The disc 94 is journaled upon one arm of an L-shaped bracket 100 that is pivotally mounted at its elbow upon a post 101 that is adjustably mounted in a holder 102 that is clamped onto the sleeve or bushing 80 of the bracket 78. The other arm of the bracket 100, designated 100ª, is bifurcated, and straddles a lug 103 projecting laterally from the post 101. The bifurcated portion 100ª of the bracket 100 has a web 104 connecting its respective parts at their lower margins below the lug 103, and said web rests against said lug in the normal inoperative position of the device, being urged thereagainst by a tension spring 105 that is connected to a stud 106 projecting from the bracket 100 and to a stud 107 projecting from the post 101.

Connected to the free end of the arm 100ª of the bracket 100 is a chain or cable 110 that is trained over a sheave 111 journaled upon the sleeve 80, between the bracket 78 and the holder 102. The other end of the chain 110 is connected to one end of a tension spring 112, the other end of the latter being connected to a screw-eye 113 that is adjustably mounted for lateral movement in a slot 114 formed in a horizontal bar 115 mounted upon a pair of legs 116, 116 upon the deck 18. The chain 110 is slack in the inoperative position of the device, as is shown in Figure 1, and the spring 112 is of considerably greater strength than the spring 105.

The operation of the bead-stitching mechanism is as follows. The parts being in the inoperative position shown in Figures 1 and 2, pressure fluid is admitted to the cylinder 85 which causes the arms 75 slowly to pivot around their axes 26 and to carry the tools between their free ends toward the tire structure 71 on the form 15, the latter being rotated rapidly. The tools 93 first engage the loose fabric margins 72 and fold them radially inwardly, as is shown in Figure 7, and apply them to the lateral faces of the bead portions of the tire. As the lever arms 75 reach substantially the position shown in Figure 5, the chains 110 become taut, with the result that the brackets 100 are tilted angularly, against the tension of the springs 105, whereby the discs 94 are moved into engagement with the lateral faces of the tire beads, as is shown in Figure 8.

As the arms 75 continue to rise toward the extreme operative position shown in Figure 6, the tools 93 move forwardly to the position shown in Figure 9, whereby the marginal portions 72 of the tire plies are folded completely over the lateral faces of the tire beads. This final rising movement of the arms 75, after the discs 94 have engaged the work and their brackets 100 are thereby restrained against further angular movement, causes the chains 110 to pull and elongate the springs 112 to store up energy therein. Thus when the discs 94 reach the inner periphery of the tire beads the tension in the springs 112 will further tilt the supporting brackets 100, whereby the discs are caused to move under the tire beads to apply the edges of the marginal portions of the tire fabric plies thereto, as is clearly shown in Figure 10. The movement of the respective elements of the apparatus is reversed when fluid is exhausted from the cylinder 85. This completes a cycle of operations of the bead-stitching mechanism.

The apparatus saves time and labor in the building of pneumatic tire casings, and achieves the other advantages set forth in the foregoing statement of objects.

Modification may be resorted to within the scope of the appended claims which are not limited wholly to the specific construction shown and described.

What is claimed is:

1. In tire building apparatus, the combination of a tread-pressed device, a bead-stitching device, a deck upon which said devices are mounted, a support for said deck consisting of a plurality of screws threaded therethrough, and means for concurrently rotating said screws to elevate or lower the deck while maintaining it in horizontal position.

2. A combination as defined in claim 1 in which the means for concurrently rotating the screws comprises sprockets on the respective screws, and a sprocket chain trained about said sprockets.

3. Tire building apparatus comprising a tread-pressing device, said device comprising two parallel series of spaced-apart presser rollers, the rollers of one series being staggered with relation to those of the other series, and means for applying said rollers to the tread portion of a drum-built tire casing.

4. Tire building apparatus comprising a tread-pressing device, said device comprising two parallel series of spaced-apart, coaxial, presser rollers, the rollers of one series being staggered with relation to those of the other series, and means yieldingly applying said rollers to the tread portion of a tire casing.

5. Tire building apparatus comprising a tread-pressing device, said device comprising two parallel series of spaced-apart, coaxial presser rollers, the rollers of one series being staggered with relation to those of the other series, individual yielding supports for each presser roller, and means for moving said presser rollers as a unit into engagement with the tread portion of a tire casing.

6. Tire building apparatus comprising a tread-pressing device, said device comprising a plurality of presser rollers disposed transversely of a tire casing, respective holders for said rollers, a slide, means for yieldingly mounting said holders in the slide, a pedestal formed with a slideway in which said slide is mounted for vertical movement, and means for moving said slide up and down in the slideway to carry the presser rollers into and out of engagement with a tire.

7. Tire building apparatus comprising a tread-pressing device, said device comprising two parallel rows of spaced-apart presser rollers, the presser rollers of one row being intercolated with the presser rollers of the other row.

8. Tire building apparatus comprising a tread-pressing device, said device comprising two parallel rows of spaced-apart presser rollers, the marginal portions of the rollers of one row being positioned between the rollers of the other row, and means for moving all of said presser rollers concurrently toward a tire casing in course of construction.

HORACE D. STEVENS.